United States Patent
Kim et al.

(10) Patent No.: US 9,464,165 B2
(45) Date of Patent: Oct. 11, 2016

(54) METHOD FOR PREPARING BIODEGRADABLE POLYESTER COPOLYMER

(71) Applicant: LOTTE FINE CHEMICAL CO., LTD., Ulsan (KR)

(72) Inventors: Hee Soo Kim, Yongin-si (KR); Ye Jin Kim, Seoul (KR); Soo Youn Choi, Jeonju-si (KR); Min Kyoung Kim, Seoul (KR); Ki Chull Yun, Cheonan-si (KR)

(73) Assignee: LOTTE FINE CHEMICAL CO., LTD. (KR)

( * ) Notice: Subject to any disclaimer, the term of this patent is extended or adjusted under 35 U.S.C. 154(b) by 0 days.

(21) Appl. No.: 14/443,448

(22) PCT Filed: Jul. 30, 2013

(86) PCT No.: PCT/KR2013/006808
§ 371 (c)(1),
(2) Date: May 18, 2015

(87) PCT Pub. No.: WO2014/081101
PCT Pub. Date: May 30, 2014

(65) Prior Publication Data
US 2015/0299384 A1 Oct. 22, 2015

(30) Foreign Application Priority Data
Nov. 21, 2012 (KR) .................. 10-2012-0132597

(51) Int. Cl.
C08G 64/00 (2006.01)
C08G 63/127 (2006.01)
C08G 63/78 (2006.01)
C08G 63/20 (2006.01)
C08G 63/02 (2006.01)

(52) U.S. Cl.
CPC ............. C08G 63/127 (2013.01); C08G 63/20 (2013.01); C08G 63/78 (2013.01)

(58) Field of Classification Search
CPC ............................ C08G 63/20; C08G 63/668
USPC ........ 528/193, 194, 196, 198, 271, 272, 296
See application file for complete search history.

(56) References Cited

U.S. PATENT DOCUMENTS

| | | | |
|---|---|---|---|
| 6,020,393 A | 2/2000 | Khemani | |
| 2002/0004578 A1 | 1/2002 | Shelby et al. | |
| 2003/0139564 A1 | 7/2003 | Kratschmer et al. | |
| 2005/0124779 A1 | 6/2005 | Shelby et al. | |
| 2008/0118729 A1 | 5/2008 | Goyette et al. | |
| 2008/0119631 A1 | 5/2008 | Mullen | |
| 2009/0017320 A1 | 1/2009 | Donelson et al. | |
| 2012/0277400 A1 | 11/2012 | Chen et al. | |

FOREIGN PATENT DOCUMENTS

| | | |
|---|---|---|
| CN | 1412219 A | 4/2003 |
| CN | 1422294 A | 6/2003 |
| CN | 1890288 A | 1/2007 |
| CN | 101522419 A | 9/2009 |
| KR | 1020030029509 A | 4/2003 |
| KR | 1020060132601 A | 12/2006 |
| KR | 1020090068771 A | 6/2009 |
| WO | 2008/042226 A1 | 4/2008 |
| WO | 2008/105000 A2 | 9/2008 |

OTHER PUBLICATIONS

International Search Report with English Translation for International Application No. PCT/KR2013/006808 dated Oct. 18, 2013.
Written Opinion for International Application No. PCT/KR2013/006808 dated Oct. 18, 2013.
Chinese Office Action dated Feb. 14, 2016 for Chinese Patent Application No. 20138006447.1 and English translation of the same.
Extended European Search Report dated Jun. 2, 2016 for European Patent Application No. 13856703.7. (5 pages).

*Primary Examiner* — Terressa Boykin
(74) *Attorney, Agent, or Firm* — Fitch Even Tabin & Flannery LLP

(57) ABSTRACT

The present invention provides a method of preparing a polyester-based polymer and a polyester-based polymer prepared by the method. The method of preparing the polyester-based polymer includes a prepolymerization step of polymerizing a dicarboxylic acid compound (A), a diol compound (B), and an aromatic branching agent (C) at 160-220° C. to produce a prepolymer; and a condensation polymerization step of performing a condensation polymerization of the prepolymer at 200-250° C., under a vacuum pressure of 0.1 to 2 Torr.

12 Claims, No Drawings

METHOD FOR PREPARING BIODEGRADABLE POLYESTER COPOLYMER

TECHNICAL FIELD

The present invention relates to a method of preparing a biodegradable polyester-based polymer by using an aromatic branching agent, and a biodegradable polyester-based polymer prepared by the method.

BACKGROUND ART

Polyester is a heat-resisting, highly elastic strength synthetic resin with excellent chemical resistance, and is used for reinforced plastics. For example, polyester is widely used for car bodies, bodies of motor boat, and furniture, and also as a fiber material for clothes.

From among polyesters, biodegradable polyester-based polymers are polymers that may decompose to water and carbon dioxide, or water and methane gas by microorganisms existing in the nature such as bacteria, algae, and fungi. Such biodegradable polyester-based polymers do not cause environmental pollution and thus are environment-friendly.

Biodegradable polyester-based polymers can be produced by a condensation reaction of, for example, diol and diacid. There are various kinds of polyester-based polymers including aliphatic polyester-based copolymers and aromatic polyester-based copolymers as examples of the biodegradable polyester-based polymers.

Biodegradable polyester-based polymers can be produced through an esterification reaction and a polycondensation reaction. In the esterification reaction, oligomers are produced by a condensation reaction, and in the condensation reaction, a polymer is produced from the oligomers.

In producing biodegradable polyester-based polymers, to shorten a reaction time, various branching agents are used in a method of preparing a biodegradable polyester-based polymer. Particularly, isocyanates and other multifunctional acids or alcohols are used as branching agents.

Conventional aliphatic branching agents for preparing a biodegradable polyester-based polymer have a problem in that a yellowness index of polymers obtained by polymerization is high. In addition, conventional methods for preparing a biodegradable polyester-based polymer have a problem in that the polymerization time is long because branching agents have low reactivity and are not homogeneously dispersed in a reaction mixture.

DETAILED DESCRIPTION OF THE INVENTIVE CONCEPT

Technical Problem

An embodiment of the present invention provides a method of preparing a polyester-based polymer.

Another embodiment of the present invention provides a polyester-based polymer prepared by the method.

Technical Solution

One aspect of the present invention provides a method of preparing a biodegradable polyester-based polymer including:

a prepolymerization step of polymerizing a dicarboxylic acid compound (A), a diol compound (B), and a branching agent (C) which represented by the formula (1) below, at 160-220° C. to produce a prepolymer; and a condensation polymerization step of performing a condensation polymerization of the prepolymer at 200-250° C., under a vacuum pressure of 0.1 to 2 Torr:

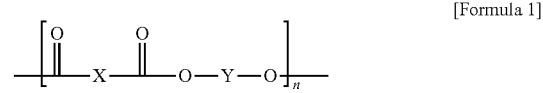

[Formula 1]

In Formula 1, X is selected from the group consisting of a substituted or unsubstituted $C_6$-$C_{30}$ arylene group and a substituted or unsubstituted $C_2$-$C_{30}$ heteroarylene group, X may include at least one —COOR', wherein R' is selected from the group consisting of a hydrogen atom, a halogen atom, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{30}$ aryl group, a substituted or unsubstituted $C_7$-$C_{30}$ arylalkyl group, a substituted or unsubstituted $C_2$-$C_{30}$ heteroaryl group, and a substituted or unsubstituted $C_3$-$C_{30}$ heteroarylakyl group, Y is selected from the group consisting of a substituted or unsubstituted $C_1$-$C_{30}$ alkylene group, a substituted or unsubstituted $C_1$-$C_{30}$ heteroalkylene group, a substituted or unsubstituted $C_3$-$C_{30}$ cycloalkylene group, a substituted or unsubstituted $C_3$-$C_{30}$ heterocycloalkylene group, a substituted or unsubstituted $C_6$-$C_{30}$ arylene group, and a substituted or unsubstituted $C_2$-$C_{30}$ heteroarylene group, and n is 1 to 100.

The amount of the branching agent (C) used may be 0.1 to 5 wt % with respect to the total weight of the dicarboxylic acid compound (A) and the diol compound (B).

The ratio of the amount of the dicarboxylic acid compound (A) used to the amount of the diol compound (B) used may be 1:1 to 1:4, based on the molar ratio.

When two species from among the dicarboxylic acid compound (A) and its derivatives are used, the ratio between the amounts of the above two species may be 1:1 to 1:1.3, based on the molar ratio.

The branching agent (C) may be used in the prepolymerization step in the form of being dispersed or dissolved in an aliphatic diol having three or more carbons.

X may be a substituted or unsubstituted $C_6$-$C_{20}$ phenylene group.

Y may be selected from the group consisting of a substituted or unsubstituted $C_2$-$C_{10}$ alkylene group and a substituted or unsubstituted $C_6$-$C_{20}$ phenylene group.

The dicarboxylic acid compound (A) may be one or more species selected from the group consisting of a substituted or unsubstituted $C_4$-$C_{10}$ aliphatic dicarboxylic acid, a derivative of the aliphatic dicarboxylic acid, a substituted or unsubstituted $C_8$-$C_{20}$ aromatic dicarboxylic acid, and a derivative of the aromatic dicarboxylic acid.

The diol compound (B) may be one or more species selected from the group consisting of a substituted or unsubstituted $C_2$-$C_{10}$ aliphatic diol, and a substituted or unsubstituted $C_6$-$C_{20}$ aromatic diol.

The prepolymerization step may be carried out in the presence of at least one of a catalyst and a thermostabilizer.

The prepolymerization step includes a first prepolymerization step of polymerizing a first dicarboxylic acid compound and a diol compound to produce a first prepolymer; and a second prepolymerization step of polymerizing the first prepolymer and a second dicarboxylic acid compound to produce a second prepolymer; and the branching agent (C) may be used in at least one step of the first prepolymerization step, the second prepolymerization step, and the condensation polymerization step.

Another aspect of the present invention provides a biodegradable polyester-based polymer prepared by the previously described method.

The biodegradable polyester-based polymer may have a number-average molecular weight of 60,000 to 70,000, a weight-average molecular weight of 130,000 to 160,000, and a polydispersity index (PDI) of 1.8 to 2.4.

The biodegradable polyester-based polymer may have a value "L" of 80 to 100, a value "a" of –1.0 to 2.0, and a value "b" of –0.7 to 3 in the L*a*b* color system.

Advantageous Effects

A method of preparing a biodegradable polyester-based polymer according to an embodiment of the present invention provides a biodegradable polyester-based polymer having a higher whiteness index and a lower yellowness index than a conventional biodegradable polyester-based polymer.

BEST MODE

The following is a detailed description of a method of preparing a biodegradable polyester-based polymer according to an embodiment of the present invention and a biodegradable polyester-based polymer prepared by the method.

In the present description, a "branching agent" refers to a material used in a process of preparing a polymer in order to obtain a polymer having a network structure by linking linear oligomers.

In the present description, a "dicarboxylic acid compound" refers to a compound containing two carboxyl groups.

In the present description, "derivatives of a dicarboxylic acid compound" refer to compounds including all derivatives of a dicarboxylic acid compound such as an ester derivative, an acyl halide derivative, and an anhydride derivative thereof.

In the present description, a "diol compound" refers to a compound containing two hydroxyl groups.

In the present description, a "tricarboxylic acid compound" refers to a compound containing three carboxyl groups.

In the present description, "derivatives of a tricarboxylic acid compound" refer to compounds including all derivatives of a tricarboxylic acid compound such as an ester derivative, an acyl halide derivative, and an anhydride derivative thereof.

In the present description, an "extent of reaction" refers to a ratio of an actual polymer yield to a theoretical polymer yield. An "extent of reaction" can be obtained, for example, in case of performing a condensation polymerization of a dicaboxylic acid compound and a diol compound, by measuring a ratio of the actual produced moisture content to the theoretical moisture content which can be produced when the dicaboxylic acid compound and the diol compound are reacted to attain a reaction yield of 100%.

According to an aspect of the present invention, a method of preparing a biodegradable polyester-based polymer includes a prepolymerization step of polymerizing a dicarboxylic acid compound (A), a diol compound (B), and a branching agent (C), which is represented by Formula (1) below, at 160-220° C. to produce a prepolymer; and a condensation polymerization step of performing a condensation polymerization of the prepolymer at 200-250° C., under a vacuum pressure of 0.1 to 2 Torr:

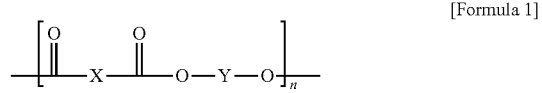

[Formula 1]

In Formula 1, X is selected from the group consisting of a substituted or unsubstituted $C_6$-$C_{30}$ arylene group and a substituted or unsubstituted $C_2$-$C_{30}$ heteroarylene group, wherein X may include at least one —COOR', wherein R' is selected from the group consisting of a hydrogen atom, a halogen atom, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{30}$ aryl group, a substituted or unsubstituted $C_7$-$C_{30}$ arylalkyl group, a substituted or unsubstituted $C_2$-$C_{30}$ heteroaryl group, and a substituted or unsubstituted $C_3$-$C_{30}$ heteroarylakyl group, Y is selected from the group consisting of a substituted or unsubstituted $C_1$-$C_{30}$ alkylene group, a substituted or unsubstituted $C_1$-$C_{30}$ heteroalkylene group, a substituted or unsubstituted $C_3$-$C_{30}$ cycloalkylene group, a substituted or unsubstituted $C_3$-$C_{30}$ heterocycloalkylene group, a substituted or unsubstituted $C_6$-$C_{30}$ arylene group, and a substituted or unsubstituted $C_2$-$C_{30}$ heteroarylene group, and n is 1 to 100.

When a polymerization temperature in the prepolymerization step is lower than 160° C., the reactivity of monomers is low, so that the polymerization time may increase. When a polymerization temperature in the prepolymerization step is higher than 220° C., a thermal decomposition of the prepolymer may occur.

When a polymerization temperature of the condensation polymerization step is lower than 200° C., the reactivity of oligomers is low, so that the polymerization time may increase. When a polymerization temperature of the condensation polymerization step is higher than 250° C., a thermal decomposition of a produced polymer may occur.

When a polymerization pressure of the condensation polymerization step is higher than 2 Torr, the unreacted diol compound that are excessively used and other monomers are hard to be eliminated, so that the polymerization time may increase. In addition, the polymerization pressure in the condensation polymerization step is in reality difficult to be lowered below 0.1 Torr. Specifically, the polymerization pressure in the condensation polymerization may be 0.5 to 1 Torr.

The branching agent (C) may increase a whiteness index and decrease a yellowness index of a polymer, which is a final product. Since a material containing an aromatic group is thermally stable more than a material containing an aliphatic group, the material containing an aromatic group may increase a whiteness index and decrease a yellowness index.

The branching agent (C) may be produced by carrying out condensation reaction between a tricarboxylic acid compound and a diol compound. For example, the branching agent (C) may be produced by a method including a step of heating a mixture of a tricarboxylic acid compound and a diol compound at 150 to 200° C. In producing the branching agent (C), the amount of the diol compound (B) used may be excessive in comparison with the amount of the tricarboxylic acid compound (A) used. For example, the amount of the diol compound (B) may be 1.0 to 1.3 times, e.g., 1.04 to 1.07 times greater than the amount of tricarboxylic acid (A) compound, in terms of chemical equivalent.

A tricarboxylic acid compound used for producing of the branching agent (C) may be a compound that is formed by adding a carboxylic group to a dicarboxylic acid compound. A tricarboxylic acid compound used for producing of the branching agent (C) may include one or more species selected from the group consisting of a trimellitic acid, a trimesic acid, and a trimellitic anhydride.

A diol compound used for producing of the branching agent (C) may include one or more species selected from the group consisting of 1,2-propanediol, 1,3-propanediol, 1,4-butanediol, 2,3-butanediol, 1,2-butanediol, 1,5-pentanediol, and 1,4-cyclohexanediol.

The amount of the branching agent (C) may be 0.1 to 5 wt % with respect to the total weight of the dicarboxylic acid compound (A) and the diol compound (B). If the amount of the branching agent (C) used is within the range (0.1 to 5 wt %), the production time of a polymer is decreased, and a polymer having a high whiteness index and a low yellowness index can be obtained.

The ratio of the amount of the dicarboxylic acid compound (A) used to the amount of the diol compound (B) used may be 1:1 to 1:4, based on the molar ratio. If the ratio of the amount of the dicarboxylic acid compound (A) used to the amount of the diol compound (B) used is within the range (1:1 to 1:4), the extent of reaction may be increased. For example, the amount of the diol compound (B) may be excessive in comparison with the amount of the dicarboxylic acid compound (A). Specifically, the amount of the diol compound (B) used may be 1.0 to 1.3 times, e.g., 1.04 to 1.07 times greater than the amount of dicarboxylic acid compound (A) used, in terms of chemical equivalent.

The prepolymerization step may be performed for 70 to 110 minutes. An end point of the prepolymerization step may be determined by measuring the amount of alcohol or water, which is a byproduct of the step. For example, when 1 mol of dimethyl terephthalate, as a dicarboxylic acid compound (A), and 1.3 mol of 1,4-butanediol, as a diol compound (B), are used, if it is assumed that all amount of the used dimethyl terephthalate has reacted with the butanediol, the prepolymerization step may be ended after more than 95% (that is, 1.9 mol) of 2 mol methanol, which is supposed to be produced, is generated as a byproduct.

In order to increase a reaction rate by moving a chemical equilibrium in the prepolymerization step, alcohol, water, which are byproducts, and/or an unreacted diol compound may be discharged out of the reaction system by evaporation or distillation.

The condensation polymerization step may be performed for 100 to 150 minutes, for example, 110 minutes.

The form of the branching agent (C) used to the prepolymerization step is not specifically limited. For example, the branching agent (C) may be used in the prepolymerization step in the form of being dispersed or dissolved in a solvent such as an aliphatic diol having three or more carbons. When the branching agent (C) is dispersed in a solvent such as an aliphatic diol having three or more carbons, as described previously, the branching agent (C) may be dispersed in the solvent at a concentration of about 50 wt % and used as a form of a dispersion.

The aliphatic diol having three or more carbons may include one or more species selected from the group consisting of, for example, 1,2-propanediol, 1,3-propanediol, 1,4-butanediol, 2,3-butanediol, 1,2-butanediol, 1,5-pentanediol, and 1,4-cyclohexanediol.

X may be a substituted or unsubstituted $C_6$-$C_{20}$ phenylene group.

Y may be selected from the group consisting of a substituted or unsubstituted $C_2$-$C_{10}$ alkylene group and a substituted or unsubstituted $C_6$-$C_{20}$ phenylene group.

The dicarboxylic acid compound (A) may be one or more species selected from the group consisting of a substituted or unsubstituted $C_4$-$C_{10}$ aliphatic dicarboxylic acid, a derivative of the aliphatic dicarboxylic acid, a substituted or unsubstituted $C_8$-$C_{20}$ aromatic dicarboxylic acid, and a derivative of the aromatic dicarboxylic acid. For example, the dicarboxylic acid compound (A) may be one or more species selected from the group consisting of a $C_4$-$C_{10}$ aliphatic dicarboxylic acid, a derivative of the aliphatic dicarboxylic acid, a $C_8$-$C_{20}$ aromatic dicarboxylic acid, and a derivative of the aromatic dicarboxylic acid.

The dicarboxylic acid compound (A) may be a compound expressed by Formula 2 below.

$$R_2OOC\text{-}Ar\text{-}COOR_2 \quad \text{[Formula 2]}$$

In Formula 2, Ar is a substituted or unsubstituted $C_2$-$C_8$ alkylene group, a substituted or unsubstituted $C_2$-$C_8$ heteroalkylene group; a substituted or unsubstituted $C_5$-$C_8$ cycloalkylene group; a substituted or unsubstituted $C_4$-$C_8$ heterocycloalkylene group; a substituted or unsubstituted $C_6$-$C_{18}$ arylene group; or a substituted or unsubstituted $C_2$-$C_{18}$ heteroarylene group; and $R_2$ is hydrogen or a substituted or unsubstituted $C_1$-$C_{10}$ alkyl group.

Specifically, the dicarboxylic acid compound (A) may be one or more species selected from the group consisting of a dimethyl terephthalic acid, a terephthalic acid, a dimethyl phthalic acid, a phthalic acid, a dimethyl isophthalic acid, an isophthalic acid, a dimethyl naphthalene 2,6-dicarboxylic acid, a naphthalene 2,6-dicarboxylic acid, an oxalic acid, a malonic acid, a succinic acid, a glutaric acid, an adipic acid, a pimelic acid, an azelaic acid, a sebacic acid, a nonanoic acid, a decanoic acid, and a dodecanoic acid.

When two species of the dicarboxylic acid compound (A) are used, the ratio between the amounts of the above two species may be 1:1 to 1:1.3, based on the molar ratio.

The diol compound (B) may be one or more species selected from the group consisting of an aliphatic diol, a derivative of the aliphatic diol, an aromatic diol, and a derivative of the aromatic diol. For example, the diol compound (B) may be one or more species selected from the group consisting of a $C_2$-$C_{10}$ aliphatic diol, and a $C_6$-$C_{20}$ aromatic diol.

The diol compound (B) may be a compound expressed by Formula 3 below.

$$HO\text{—}R_1\text{—}OH \quad \text{[Formula 3]}$$

In Formula 3, $R_1$ is a substituted or unsubstituted $C_2$-$C_{10}$ alkylene group; a substituted or unsubstituted $C_2$-$C_{10}$ heteroalkylene group; a substituted or unsubstituted $C_5$-$C_{10}$ cycloalkylene group; a substituted or unsubstituted $C_3$-$C_{10}$ heterocycloalkylene group; a substituted or unsubstituted $C_6$-$C_{20}$ arylene group; or a substituted or unsubstituted $C_4$-$C_{20}$ heteroarylene group.

The diol compound (B) may be one or more species selected from the group consisting of 1,2-propanediol, 1,3-propanediol, 1,4-butanediol, 2,3-butanediol, 1,2-butanediol, 1,5-pentanediol, and 1,4-cyclohexanediol.

The "arylene group" may be, but is not limited to, a phenylene group, a biphenylene group, a terphenylene group, a stilbenylene group, a naphthylenyl group, and compounds having the structures shown below. In the structures shown below, a line passing through two or more rings indicates that an arbitrary site of the rings through which the line passes may be substituted.

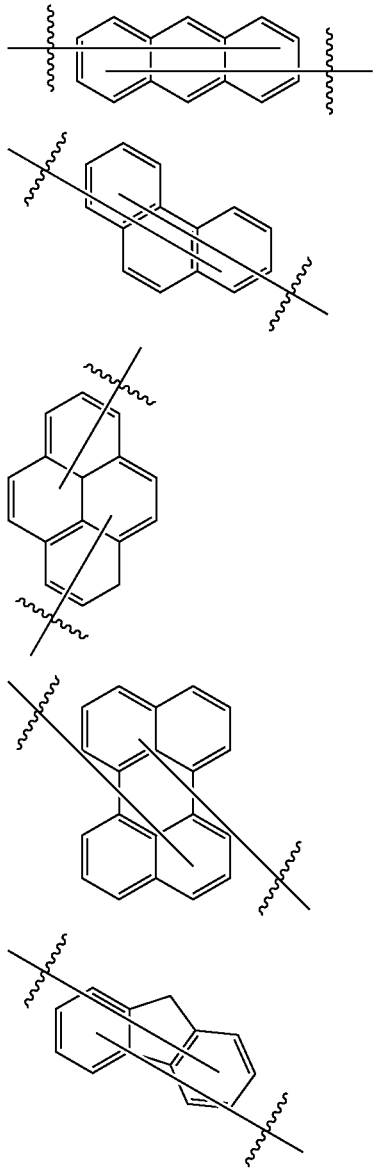

The "heteroarylene group" may contain O, N, or S as a heteroatom and may be, but is not limited to, compounds having the structures shown below, for example. In the structures shown below, a line passing through two or more rings indicates that an arbitrary site of the rings through which the line passes may be substituted.

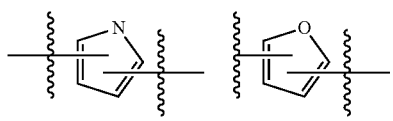

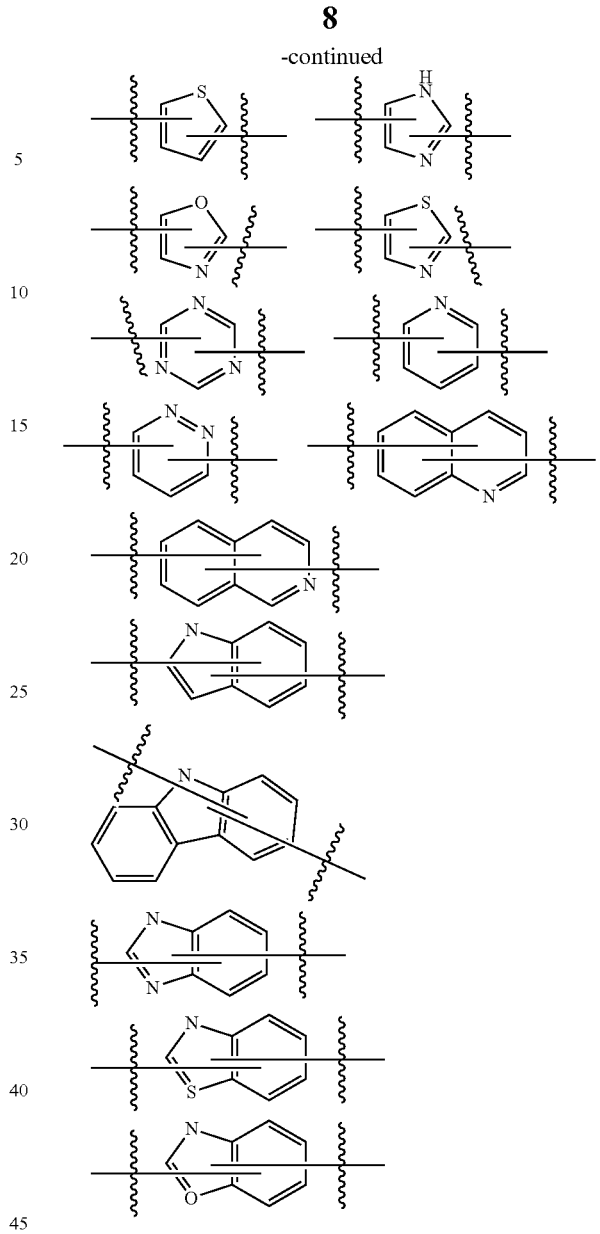

The "halogen atom" may be, for example, F, Cl, Br or I.

The "alkyl group" may have, for example, a chain, branched, or ring shape, and may be a methyl, ethyl, propyl, isobutyl, sec-butyl, tert-butyl, pentyl, or hexyl group. One or more hydrogen atoms contained in the alkyl group may be substituted with another substituent. Non-limiting examples of the substituent include a $C_1$-$C_{10}$ alkyl group, a $C_2$-$C_{10}$ alkenyl group, a $C_2$-$C_{10}$ alkynyl group, a $C_6$-$C_{12}$ aryl group, a $C_2$-$C_{12}$ heteroaryl group, a $C_6$-$C_{12}$ arylakyl group, a halogen atom, a cyano group, an amino group, an amidino group, a nitro group, an amide group, a carbonyl group, a hydroxyl group, a sulfonyl group, a carbamate group, and a $C_1$-$C_{10}$ alkoxy group.

The "alkenyl group" or the "alkynyl group" refers to an alkyl group containing at least one carbon-carbon double bond or triple bond in the middle or at an end thereof, respectively. Examples of the "alkenyl group" or the "alkynyl group" are ethylene, propylene, butylene, hexylene, and acetylene. One or more hydrogen atoms in the alkenyl group or alkynyl group may be substituted with a substituent, as in the case of the alkyl group.

The "aryl group" may be, for example, monocyclic or polycyclic. Specifically, a monocyclic aryl group may be, but is not limited to, a phenyl group, a biphenyl group, a terphenyl group or a stilbenyl group. A polycyclic aryl group may be, but not limited to, a naphthyl group, an anthryl group, a phenanthryl group, a pyrenyl group, a perylenyl group, a crycenyl group, or a fluorenyl group. One or more hydrogen atoms in the aryl group may be respectively substituted with a substituent, as in the case of the alkyl group.

The "heteroaryl group" may contain O, N or S as a heteroatom. Specifically, the heteroaryl group may be, but is not limited to, a furan group, a pyrrole group, a thiophene group, an imidazole group, an oxazole group, a thiazole group, a triazole group, a pyridyl group, a pyridazil group, a quinolinyl group, an isoquinolinyl group, an acridyl group, and compounds having the structures shown below. In the structures shown below, a line passing through two or more rings indicates that an arbitrary site of the rings through which the line passes may be substituted. One or more hydrogen atoms in the aryl group may be respectively substituted with a substituent, as in the case of the alkyl group.

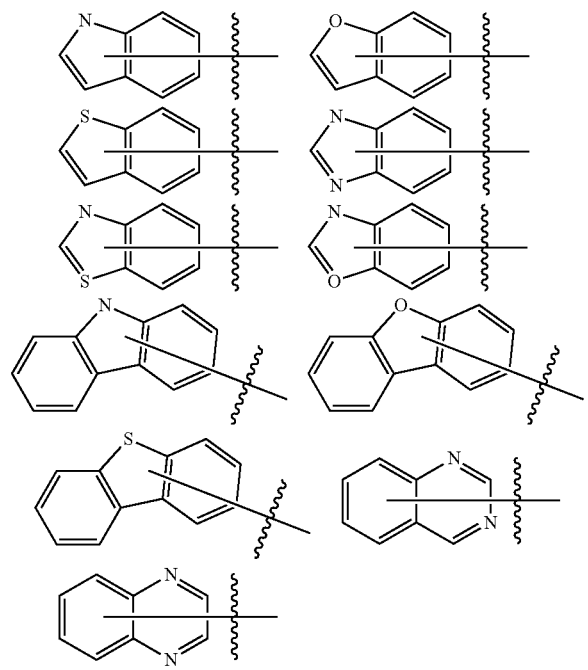

The prepolymerization step may be carried out under the presence of at least one of a catalyst and a thermostabilizer.

The catalyst may include magnesium acetate, stannous acetate, tetra-n-butyl titanate, and lead acetate, sodium acetate, potassium acetate, antimony trioxide, N,N-dimethylaminopyridine, N-methylimidazole, and a combination thereof. The metal compound catalyst may be added simultaneously with a monomer (i.e., the dicarboxyl acid compound (A) or the diol compound (B)) or a branching agent (C), and a transesterification may occur under the presence of the metal compound catalyst. For example, the amount of the metal compound catalyst may be 100 to 500 ppm with respect to the weight of the dicarboxylic acid compound (A) added during the reaction.

The thermostablizer may be an organic or inorganic phosphorus compound. The organic or inorganic phosphorus compound may be, for example, a phosphoric acid and its organic ester; and a phosphorous acid and its organic ester. A commercially available thermostablizer may be, for example, a phosphoric acid, alkyl or aryl phosphates, specifically, a triphenyl phosphate. For example, the amount of an organic or inorganic phosphorus compound used, when a metal compound catalyst and an organic or inorganic phosphorus compound are used together may be 100 to 500 ppm with respect to the weight of a dicarboxylic acid compound (A) added during the reaction.

In an embodiment of the present invention, the method of preparing a biodegradable polyester-based polymer may include a first prepolymerization step of producing a first prepolymer by polymerizing a first dicarboxylic acid compound and a diol compound in a reactor; a second prepolymerization step of further adding a second dicarboxylic acid compound and a branching agent to the reactor and polymerizing them to produce a second prepolymer; and the condensation polymerization step of performing a condensation polymerization of the second prepolymer at 200 to 250° C., under a vacuum pressure of 0.1 to 2 Torr. By dividing the prepolymerization step into a first prepolymerization step and a second prepolymerization step, an extent of reaction may increase.

The first prepolymerization step may be carried out under the presence of the catalyst and the thermostabilizer, and the second prepolymerization step may be carried out under the presence of the catalyst.

The branching agent (C) may be added, for example, in the early stage of the first prepolymerization step, in the early stage of the second polymerization step, and in the early stage of the condensation polymerization step.

Another aspect of the present invention provides a biodegradable polyester-based polymer prepared by a method of an aspect of the present invention.

The biodegradable polyester-based polymer may have a number-average molecular weight of, for example, 60,000 to 70,000.

The biodegradable polyester-based polymer may have a weight-average molecular weight of, for example, 130,000 to 160,000.

The biodegradable polyester-based polymer may have a PDI of, for example, 2.0 to 2.4. Herein, "PDI" is a polydispersity index, and is measured as a weight-average molecular weight divided by a number-average molecular weight.

The biodegradable polyester-based polymer may have a value "L" of 80 to 100, a value "a" of −1.0 to 2.0, and a value "b" of −0.7 to 3 in the L*a*b* color system. "L", "a", and "b" are color indices in the CIE-L*a*b* (CIE 1976) color system, wherein "L" stands for lightness, greater "L" indicating a lighter color, "a" stands for a degree of red color, greater "a" indicating a higher redness index, and "b" stands for a degree of yellow color, greater "b" indicating a higher yellowness index. For example, the biodegradable polyester-based polymer may have a value "L" of 85 to 100 and a value "b" of −0.7 to 0.7. Within this range, the biodegradable polyester-based polymer can have excellent color and visibility.

The biodegradable polyester-based polymer can be used in preparing a molded product. The molded product can be, for example, an injection molded product, sheets, automobile interior material, an electronic appliance case, a storage case, a mobile phone case, packaging film, or an envelope.

The following is a more detailed description of exemplary embodiments of the present invention. These exemplary embodiments are intended only to illustrate the present invention, and it will be apparent to those of ordinary skill in the art to which the present invention belongs to that the scope of the present invention is not limited by these exemplary embodiments.

MODE OF THE INVENTIVE CONCEPT

Preparation Example

Preparation of an Aromatic Branching Agent Dispersion 85.3 g (0.40 mol) of trimellitic acid and 47.6 g (0.52 mol) of 1,4-butanediol were put into a 500 mL Erlenmeyer flask having a stirrer. The mixture was heated at 190° C. for 60 minutes and reacted until 18 g of water were discharged. At that time, the extent of polymerization reaction was about 82%, the extent of polymerization reaction means a ratio of the actual produced moisture content to the theoretical moisture content which can be produced when the dicaboxylic acid compound and the diol compound are reacted to attain a reaction yield of 100%. As a result, 111 g of an aromatic branching agent were obtained. Then, 111 g of 1,4-butanediol were added to the obtained aromatic branching agent, and a 50 wt % dispersion of an aromatic branching agent was obtained. At that time, the dispersion was discharged after being stirred the reaction mixture until the internal reaction temperature reached 60° C.

Comparative Preparation Example

Preparation of an Aliphatic Branching Agent Dispersion 157.8 g (1.17 mol) of maleic acid and 65.8 g (1.06 mol) of 1,2-ethanediol were put into a 500 ml Erlenmeyer flask having a stirrer. The mixture was heated at 200° C. for 60 minutes and reacted until 38.9 g of water were discharged. At that time, the extent of polymerization reaction was about 92.3%. As a result, 182.4 g of an aliphatic branching agent were obtained. Then, 182.4 g of 1,2-ethanediol were added to the obtained aliphatic branching agent, and a 50 wt % dispersion of an aliphatic branching agent was obtained. At that time, the dispersion was discharged after being stirred until the internal reaction temperature reached 60° C.

Example

Example was carried out by the method described below.
(Prepolymerization Step)
A mixture was prepared by adding 93.21 g (0.48 mol) of dimethyl phthalate, 117.16 g (1.3 mol) of 1,4-butanediol, 0.3 g of tetra-n-butyl titanate and 0.1 g of triphenyl phosphate into a 500 ml three-neck round bottom flask having a Dean-Stark condenser, a nitrogen inlet, and a stirrer. The mixture was reacted at 200° C. in a nitrogen atmosphere for about 40 minute until 36 ml of methanol were discharged. Then, 75.99 g (0.52 mol) of adipic acid and 1.0 g of the dispersion of the aromatic branching agent obtained by the Preparation Example were added into the three-neck round bottom flask, and reacted at 200° C. in the nitrogen atmosphere for about 70 minutes until 18 ml of water were discharged. As a result, a prepolymer was obtained.
(Condensation Polymerization Step)
Subsequently, the three-neck round bottom flask was heated at 240° C. under a vacuum pressure of 0.5-0.7 Torr for 105 minutes, and the mixture was discharged. As a result, a biodegradable polyester-based polymer was obtained.

Comparative Examples 1 to 3

Comparative Examples 1 to 3 were carried out under the reaction conditions shown in Table 1.
Except the reaction conditions in Table 1, other conditions were the same with those of Embodiment 1.

TABLE 1

|  |  | Comparative Example 1 | Comparative Example 2 | Comparative Example 3 |
|---|---|---|---|---|
| 1,4-butanediol (g) | | 117.16 | 117.16 | 117.16 |
| adipic acid (g) | | 75.99 | 75.99 | 75.99 |
| dimethyl phthalate (g) | | 93.21 | 93.21 | 93.21 |
| branching agent (g) | trimellitic acid | 0.5 | 0 | 0 |
| | malic acid dispersion* | 0 | 1.3 | 0 |
| | citric acid | 0 | 0 | 0.5 |
| tetra-n-butyl titanate (g) | | 0.3 | 0.3 | 0.3 |
| triphenyl phosphate (g) | | 0.1 | 0.1 | 0.1 |
| prepolymerization reaction time (minute) | | 104 | 100 | 80 |
| condensation polymerization reaction time (minute) | | 115 | 113 | 105 |

*A dispersion obtained by dispersing 0.5 g of malic acid oligomer in 0.8 g ethyleneglycol.

Evaluation Example (1) Color Evaluation

A chip of the biodegradable polyester-based polymer of Comparative Examples 1-3 and Example was fed to a glass cell (internal diameter 10 mm×depth 50 mm), and L*, a* and b* of the CIE-L*a*b* (CIE 1976) color system were measured by using a Konica Minolta color difference meter.

(2) Molecular Weight Evaluation

The polyester-based polymers of Comparative Examples 1-3 and Example were diluted with chloroform to a concentration of 0.1 wt % to prepare a solution in order to measure a weight-average molecular weight (Mw) and a number-average molecular weight (Mn) by gel permeation chromatography (GPC). The measurement was performed at 35° C. with a flow rate of 1 ml/min.

TABLE 2

| | Color (L/a/b) | Molecular weight (Mn/Mw/PDI) |
|---|---|---|
| Comparative Example 1 | 83.4/−0.3/−0.9 | 63,000/143,000/2.2 |
| Comparative Example 2 | 81.9/0.9/3.3 | 60,000/146,000/2.4 |
| Comparative Example 3 | 84.0/0.9/2.8 | 65,000/157,000/2.3 |
| Example | 86.8/−0.7/−0.5 | 64,000/138,000/2.1 |

According to Table 2 above, upon comparing the biodegradable polyester-based polymer of Example with the biodegradable polyester-based polymer of Comparative Examples 1 to 3, which were prepared using the same amount (0.5 g) of the branching agent, it is apparent that the biodegradable polyester-based polymer of Example has a higher whiteness index (i.e., the "L" value) and a lower yellowness index (i.e., the "b" value) than the biodegradable polyester-based polymer of Comparative Examples 1 to 3.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing a biodegradable polyester-based polymer including:
   a prepolymerization step of polymerizing a dicarboxylic acid compound (A), a diol compound (B), and a branching agent (C), which is represented by Formula 1 below, at 160-220° C. to produce a prepolymer; and
   a condensation polymerization step of performing a condensation polymerization of the prepolymer at 200-250° C., under a vacuum pressure of 0.1 to 2 Torr:

[Formula 1]

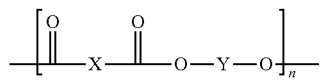

wherein X is selected from the group consisting of a substituted or unsubstituted $C_6$-$C_{30}$ arylene group and a substituted or unsubstituted $C_2$-$C_{30}$ heteroarylene group,
   X may include at least one —COOR', wherein R' is selected from the group consisting of a hydrogen atom, a halogen atom, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{30}$ aryl group, a substituted or unsubstituted $C_7$-$C_{30}$ arylalkyl group, a substituted or unsubstituted $C_2$-$C_{30}$ heteroaryl group, and a substituted or unsubstituted $C_3$-$C_{30}$ heteroaryl akyl group,
   Y is selected from the group consisting of a substituted or unsubstituted $C_1$-$C_{30}$ alkylene group, a substituted or unsubstituted $C_1$-$C_{30}$ heteroalkylene group, a substituted or unsubstituted $C_3$-$C_{30}$ cycloalkylene group, a substituted or unsubstituted $C_3$-$C_{30}$ heterocylcoalkylene group, a substituted or unsubstituted $C_6$-$C_{30}$ arylene group, and a substituted or unsubstituted $C_2$-$C_{30}$ heteroarylene group, and
   n is 1 to 100.

2. The method of preparing a biodegradable polyester-based polymer according to claim 1, wherein the amount of the branching agent (C) used is 0.1 to 5 wt % with respect to a total weight of the dicarboxylic acid compound (A) and the diol compound (B).

3. The method of preparing a biodegradable polyester-based polymer according to claim 1, wherein the ratio of the amount of the dicarboxylic acid compound (A) used to the amount of the diol compound (B) used is 1:1 to 1:4, based on the molar ratio.

4. The method of preparing a biodegradable polyester-based polymer according to claim 1, wherein, when two species of the dicarboxylic acid compound are used, the ratio between the amounts of the above two species is 1:1 to 1:1.3, based on the molar ratio.

5. The method of preparing a biodegradable polyester-based polymer according to claim 1, wherein the branching agent (C) is used in the prepolymerization step in the form of being dispersed or dissolved in an aliphatic diol having three or more carbons.

6. The method of preparing a biodegradable polyester-based polymer according to claim 1, wherein X is a substituted or unsubstituted $C_6$-$C_{20}$ phenylene group.

7. The method of preparing a biodegradable polyester-based polymer according to claim 1, wherein Y is selected from the group consisting of a substituted or unsubstituted $C_2$-$C_{10}$ alkylene group and a substituted or unsubstituted $C_6$-$C_{20}$ phenylene group.

8. The method of preparing a biodegradable polyester-based polymer according to claim 1, wherein the dicarboxylic acid compound (A) is one or more species selected from the group consisting of a substituted or unsubstituted $C_4$-$C_{10}$ aliphatic dicarboxylic acid, a derivative of the aliphatic dicarboxylic acid, a substituted or unsubstituted $C_8$-$C_{20}$ aromatic dicarboxylic acid, and a derivative of the aromatic dicarboxylic acid.

9. The method of preparing a biodegradable polyester-based polymer according to claim 1, wherein the diol compound (B) is one or more species selected from the group consisting of a substituted or unsubstituted $C_2$-$C_{10}$ aliphatic diol, and a substituted or unsubstituted $C_6$-$C_{20}$ aromatic diol.

10. The method of preparing a biodegradable polyester-based polymer according to claim 1, wherein the prepolymerization step is carried out in the presence of at least one of a catalyst and a thermostabilizer.

11. The method of preparing a biodegradable polyester-based polymer according to claim 1, wherein the prepolymerization step includes
    a first prepolymerization step of polymerizing a first dicarboxylic acid compound and a diol compound to produce a first prepolymer, and
    a second prepolymerization step of polymerizing the first prepolymer and a second dicarboxylic acid compound to produce a second prepolymer, and
    wherein the branching agent (C) is used in at least one of the first prepolymerization step, the second prepolymerization step, and the condensation polymerization step.

12. A biodegradable polyester-based polymer prepared according to claim 1, having a value "L" of 80 to 100, a value "a" of −1.0 to 2.0, and a value of "b" of −0.7 to 3.0 in the L*a*b* color system.

* * * * *

UNITED STATES PATENT AND TRADEMARK OFFICE
CERTIFICATE OF CORRECTION

| | | |
|---|---|---|
| PATENT NO. | : 9,464,165 B2 | Page 1 of 1 |
| APPLICATION NO. | : 14/443448 | |
| DATED | : October 11, 2016 | |
| INVENTOR(S) | : Kim et al. | |

It is certified that error appears in the above-identified patent and that said Letters Patent is hereby corrected as shown below:

In the Claims

Claim 1, Column 13, Line 37, delete "akyl" and insert -- alkyl --.

Signed and Sealed this
Seventh Day of February, 2017

Michelle K. Lee
*Director of the United States Patent and Trademark Office*